(12) United States Patent
Nakahara et al.

(10) Patent No.: US 7,196,982 B2
(45) Date of Patent: Mar. 27, 2007

(54) INFORMATION RECORDING APPARATUS, INFORMATION RECORDING METHOD, PROGRAM STORAGE MEDIUM AND COMPUTER DATA SIGNAL WHICH ALLOW COMPUTER TO FUNCTION AS INFORMATION RECORDING APPARATUS

(75) Inventors: Masanori Nakahara, Saitama-ken (JP); Takao Sawabe, Saitama-ken (JP)

(73) Assignee: Pioneer Corporation, Tokyo-To (JP)

(*) Notice: Subject to any disclaimer, the term of this patent is extended or adjusted under 35 U.S.C. 154(b) by 466 days.

(21) Appl. No.: 10/195,321

(22) Filed: Jul. 16, 2002

(65) Prior Publication Data

US 2003/0016463 A1    Jan. 23, 2003

(30) Foreign Application Priority Data

Jul. 17, 2001    (JP)    ............................. 2001-217256

(51) Int. Cl.
*G11B 7/00*    (2006.01)
(52) U.S. Cl. ............................. 369/47.13; 369/47.22; 369/59.25
(58) Field of Classification Search ............... 369/47.1, 369/47.15, 47.16, 47.19, 59.14, 59.21, 59.24, 369/59.25; 704/500
See application file for complete search history.

(56) References Cited

U.S. PATENT DOCUMENTS

| | | | |
|---|---|---|---|
| 5,428,454 A | 6/1995 | Kimura et al. | ............... 358/335 |
| 5,434,674 A | 7/1995 | Masuda | ....................... 358/335 |
| 5,856,958 A * | 1/1999 | Yokota et al. | ......... 369/124.09 |
| 6,076,063 A * | 6/2000 | Unno et al. | .................. 704/500 |
| 6,515,212 B2 * | 2/2003 | Taira et al. | .................. 709/247 |
| 6,516,135 B1 * | 2/2003 | Higuchi et al. | |
| 6,971,024 B1 * | 11/2005 | Sako et al. | .................. 380/201 |
| 2002/0172117 A1 * | 11/2002 | Sako et al. | .............. 369/53.29 |

FOREIGN PATENT DOCUMENTS

| | | |
|---|---|---|
| EP | 0 851 423 A1 | 7/1998 |
| EP | 0 933 764 A1 | 8/1999 |
| EP | 952578 A2 * | 10/1999 |
| EP | 1 081 949 A1 | 3/2001 |
| EP | 1104928 A2 * | 6/2001 |
| JP | 63034771 | 2/1988 |
| JP | 2001 023294 A | 1/2001 |
| WO | WO 97/13371 | 4/1997 |

* cited by examiner

*Primary Examiner*—Andrea Wellington
*Assistant Examiner*—Jorge L. Ortiz-Criado
(74) *Attorney, Agent, or Firm*—Drinker Biddle & Reath LLP

(57) ABSTRACT

An information recording apparatus is provided with: a receiving device for receiving record information of a first format; a converting device for converting the first format of the received record information into a second format that is different from the first format; and a recording device for recording the record information of the second format on a recording medium.

8 Claims, 6 Drawing Sheets

FLOWCHART SHOWING DATA RECORDING PROCESS

INFORMATION RECORDING APPARATUS, INFORMATION RECORDING METHOD, PROGRAM STORAGE MEDIUM AND COMPUTER DATA SIGNAL WHICH ALLOW COMPUTER TO FUNCTION AS INFORMATION RECORDING APPARATUS

BACKGROUND OF THE INVENTION

1. Field of the Invention

The present invention relates to an information recording apparatus, an information recording method, a program storage medium and a computer data signal embodiment in a carrier wave. In detail, the present invention relates to an information recording apparatus for and an information recording method of recording record information such as music information, picture information or the like, which is distributed through a network, for example, such as Internet or the like, on a recording medium such as an optical disc, a magnetic disc, a semiconductor memory or the like, and a program storage medium and a computer data signal embodiment in a carrier wave, which allow a computer to function as such an information recording apparatus.

2. Description of the Related Art

In recent years, the research and the development with regard to a recording format have been advanced for recording audio information, which includes music information, sound information and the like, on a recording medium, for example, such as DVD or the like.

On the other hand, music distribution for distributing the above-mentioned audio information and the like through the network, such as Internet or the like, to a personal computer and the like is lately started (typically, this may be referred to as EMD (Electronic Music Distribution). Thus, even the above-mentioned recording format currently being developed is desired to comply with this method of the music distribution.

At the present time, as the distributing method (to be exact, a compressing method used for the distribution), there are mixed various distributing methods which are not compatible with each other, for example, such as AC-3 (Audio Compression-3) method, MP3 (MPEG (Moving Picture Expert Group) 1 Audio layer 3) method and the like.

In the conventional method of the music distribution, if the pieces of the music information distributed in accordance with the respective methods are recorded in their original states on the recording medium such as a DVD and the like, various kinds of music information compressed by the different compression methods are mixed on one recording medium. If several reproducing modules corresponding to respective compression methods are applied to the information reproducing apparatus, such various kinds of music information may be reproduced by one information reproducing apparatus, However, this causes an increase of a manufacturing cost of the information reproducing apparatus, because, if there is not compatibility of the reproducing modules each other, the respective reproducing modules are separately built in the information reproducing apparatus.

Consequently, this problem brings about an increase in an entire manufacturing cost as an information recording/reproducing system including the information reproducing apparatus and an information recording apparatus for recording the music information on a recording medium because of the increase in the manufacturing cost as the information reproducing apparatus, and thereby results in a problem that the information recording/reproducing system can not be popularized.

SUMMARY OF THE INVENTION

The present invention is proposed in view of the above mentioned problems. It is therefore an object of the present invention to provide an information recording apparatus and an information recording method, which can record music information and the like on a recording medium so as to decrease a cost of an information reproducing apparatus and thereby decrease a cost of an information recording/reproducing system and accordingly popularize it, and a program storage medium and a computer data signal embodiment in a carrier wave, which allow a computer to function as such a picture editing apparatus.

The object of the present invention can be achieved by an information recording apparatus provided with: a receiving device for receiving record information of a first format; a converting device for converting the first format of the received record information into a second format that is different from the first format; and a recording device for recording the record information of the second format on a recording medium.

According to the information recording apparatus of the present invention, the first format of the record information received from an external source is converted into the second format, and the record information having the second format is recorded on the recording medium. The second format may be a format (including a record format, a compression format, an encoding manner and the like) that can be reproduced by a plurality of kinds of information reproducing apparatuses. For example, the second format is based upon a simple, popular, or standard method (e.g. linear PCM or the like). Thus, even if the first format matches only a single or a few kinds of information reproducing apparatuses, for example, even if the first format is based upon a complex or particular method (e.g. AC-3, MP3 or the like), the record information is recorded on the recording medium in the condition that the reproduction can be carried out by the plurality of kinds of information reproducing apparatuses. Consequently, when the record information recorded on the recording medium is reproduced, compatibility can be obtained in the reproducing process. Therefore, a manufacturing cost of the information reproducing apparatus can be reduced. This may contribute popularization of an information recording/reproducing system.

In one aspect of the information recording apparatus, the first receiving device receives the record information of the first format in a compressed condition, and the converting device converts the first format of the received record information into the second format by decompressing the record information.

According to this aspect, the record information is recorded under the condition that it is not compressed. Thus, the record information after the recording can be reproduced by the wide kinds of the information reproducing apparatuses. Hence, the compatibility in the reproducing process can be attained at the higher level.

In another aspect of the information recording apparatus, it is further provided with a third receiving device for receiving a second record information of the second format; and a third recording device for recording the received second record information on the recording medium without conversion of the format.

According to this aspect, when the second record information of the second format is received from an external source, it is recorded on the recording medium without format conversion. At the stage of receiving the second record information from an external source, it has the second format that can be reproduced by a plurality of kinds of information reproducing apparatuses. Therefore, the format conversion is not needed. In accordance with the aspect of the present invention, the format conversion process is prevented in such a case. Thus, efficiency of operation of the information recording apparatus can be improved.

In another aspect of the information recording apparatus, it is further provided with a third recording device for recording the received record information on the recording medium in its original state, regardless of its format.

According to this aspect, when the record information of the first format is received from an external source, not only the record information of the second format but also the record information of the first format is recorded on the recording medium. Thus, for example, when copy limit information is set in the record information in the recording process, the copy limit information can be set on the basis of the original record information. Hence, it can be provided to the normal distribution route for the record information.

The object of the present invention can be achieved by an information recording method provided with a receiving process of receiving record information of a first format; a converting process of converting the first format of the received record information into a second format that is different from the first format; and a recording process of recording the record information of the second format on a recording medium.

According to the information recording method of the present invention, the first format of the record information received from an external source is converted into the second format, and the record information having the second format is recorded on the recording medium. The second format may be a format that can be reproduced by a plurality of kinds of information reproducing apparatuses. Thus, if the first format matches only a single or a few kinds of information reproducing apparatuses, the record information is recorded on the recording medium in the condition that the reproduction can be carried out by the plurality of kinds of information reproducing apparatuses. Consequently, compatibility can be obtained in the reproducing process. Therefore, a manufacturing cost of the information reproducing apparatus and the like can be reduced. This may contribute popularization of an information recording/reproducing system.

In one aspect of the information recording method, when the record information of the first format is received in a compressed condition, the first format of the received record information is converted into the second format by decompressing the received record information.

According to this aspect, the record information is recorded under the condition that it is not compressed. Thus, the record information after the recording can be reproduced by the wide kinds of the information reproducing apparatuses. Hence, the compatibility in the reproducing process can be attained at the higher level.

In another aspect of the information recording method, it is further provided with a third receiving process of receiving a second record information of the second format; and a third recording process of recording the received second record information on the recording medium without conversion of the format.

According to this aspect, when the second record information of the second format is received from an external source, it is recorded on the recording medium without format conversion. The second record information has the second format that can be reproduced by a plurality of kinds of information reproducing apparatuses at the stage of receiving it from an external source. Therefore, the format conversion is not needed. In accordance with the aspect of the present invention, the format conversion process is prevented in such a case. Thus, efficiency of operation of the information recording apparatus can be improved.

In another aspect of the information recording method, it is further provided with a third recording process of recording the received record information on the recording medium in its original state, regardless of its format.

According to this aspect, when the record information of the first format is received from an external source, not only the record information of the second format but also the record information of the first format is recorded on the recording medium. Thus, for example, when copy limit information is set in the record information in the recording process, the copy limit information can be set on the basis of the original record information. Hence, it can be provided to the normal distribution route for the record information.

The above object of the present invention can be also achieved by a program storage medium readable by a computer. The program storage medium stores a program of instructions to cause the computer to perform the above described method of the present invention including its various aspects.

According to the program storage medium, such as a CD-ROM (Compact Disc-Read Only Memory), a ROM, a DVD-ROM (DVD Read Only Memory), a floppy disk or the like, the above described method of the present invention can be relatively easily realized as a computer reads and executes the program of instructions or as it executes the program after downloading the program through communication device. Moreover, the program of instructions can be sent from a server device with other data such as picture information indicating the dynamic picture, audio information corresponding to it, and the like.

The above object of the present invention can be also achieved by a computer data signal embodied in a carrier wave and representing a series of instructions for a computer. The series of instructions causes the computer to perform the above described method of the present invention including its various aspects.

According to the computer data signal embodied in the carrier wave of the present invention, as the computer downloads the program in the computer data signal through a computer network or the like, and executes this program, it is possible to realize the above described method of the present invention.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Figure 1:
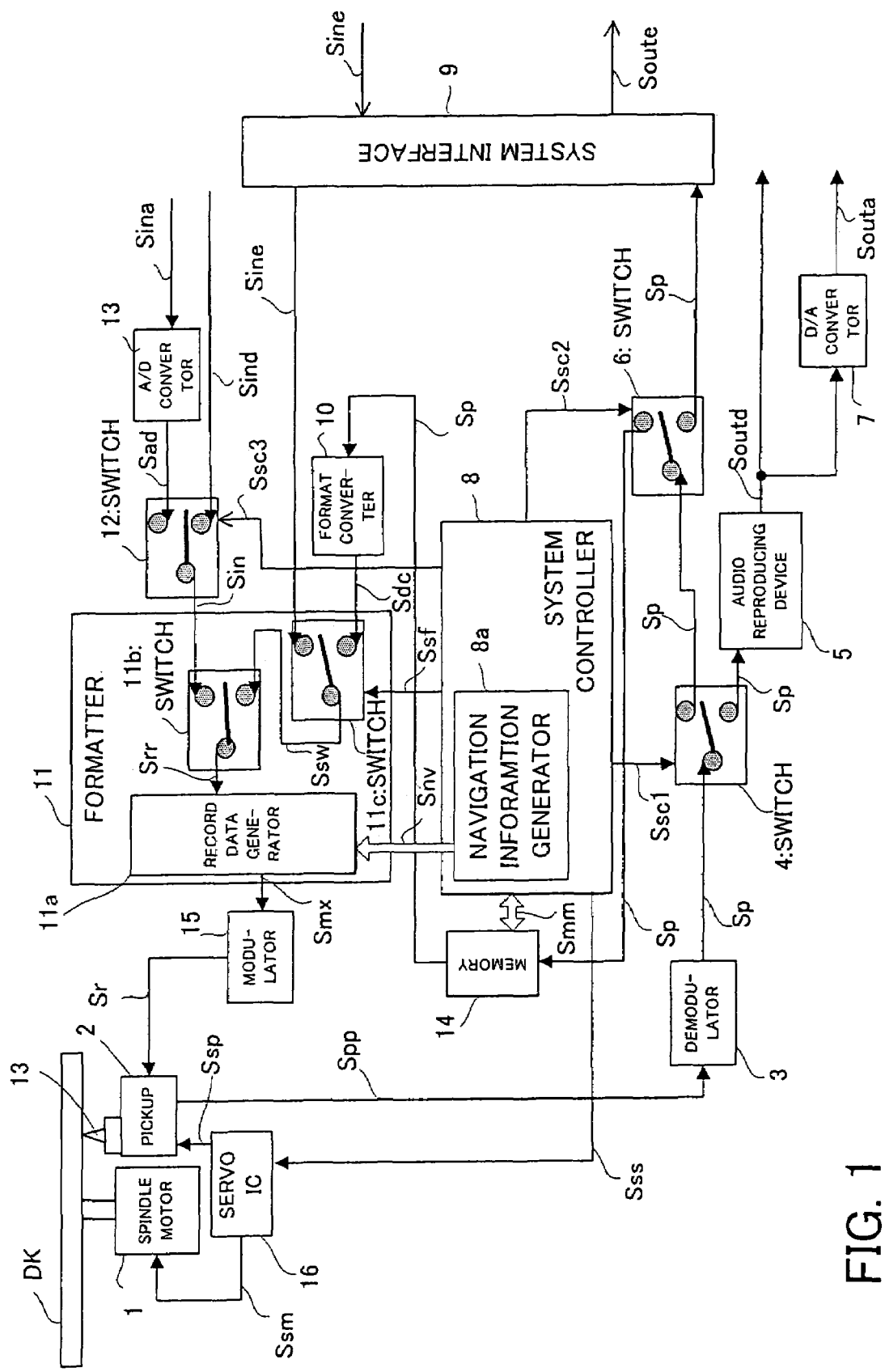
FIG. 1 is a block diagram showing a schematic configuration of an information recording apparatus according to an embodiment.

Preferred embodiments of the present invention will be described below with reference to the drawings.

The embodiments as described later are the embodiments when the present invention is applied to an information recording apparatus for recording music information distributed by using the above mentioned EMD, on an optical disc serving as a recordable recording medium.

(1) SDMI Standard

At first, the SDMI (Secure Digital Music Initiative) standard is described.

The information recording apparatus according to this embodiment complies with the SDMI standard. The SDMI standard is being defined as the standard with which an information recording apparatus for recording works on a recording medium and the like should comply, in order to protect works including music information from being illegally copied and from other troubles. Also, this is being mainly defined by music producing companies in U.S. and the like. At the current stage, the standard is being defined so as to include the following items. That is, when the EMD is used to duly record music information on a personal computer, only the reproduction through the personal computer is allowed. Or, when the work is moved to a portable reproducing apparatus from a personal computer (and the work is not copied), the number of the reproductions in the reproducing apparatus is limited. Or, copyright information is embedded in the music information distributed through the EMD by using an electronically transparent technique (so-called watermark technique).

Here, the SDMI standard is defined such that when music information is distributed by using the EMD, the music information of the distribution target is moved (and not copied) from a distribution server of a distribution source to a personal computer or the like of a distribution destination. That is, at the time of the distribution, the music information itself is erased from on the distribution server of the distribution source (or it is set at a state that the distribution is impossible on the distribution server), and it is present only on the personal computer or the like of the distribution destination.

Then, it is defined such that even if music information is moved from a personal computer of a distribution destination to, for example, a portable reproducing apparatus, the music information is no longer present on the personal computer when the move is completed, and it is present only on the portable reproducing apparatus of the movement destination.

Moreover, it is defined such that when the necessity of listening to music information is released from a distribution destination (or a movement destination from the distribution destination), the music information is returned back to an original distribution server. At this time, it is defined such that after the return, the music information is erased from the personal computer of the distribution destination in the first distribution (or the reproducing apparatus of the movement destination from the personal computer) (or, it is set at a state that the reproduction is impossible on the personal computer and the like).

As mentioned above, in the SDMI standard, it is tried to surely protect music information as a work by allowing only the movement of the music information itself without any copy.

By the way, in the SDMI standard, distribution of music information from a distribution server of a distribution source is referred to as a check-out. On the other hand, return to a distribution server from a distribution destination is referred to as a check-in. Also, movement of distributed music information in a distribution destination between a reproducing apparatus and a personal computer and the like is referred to as a move.

(2) Information Recording Apparatus

An information recording apparatus according to the embodiment complying with the above-mentioned SDMI standard will be described below with reference to FIG. 1 to FIG. 6.

Figure 2:
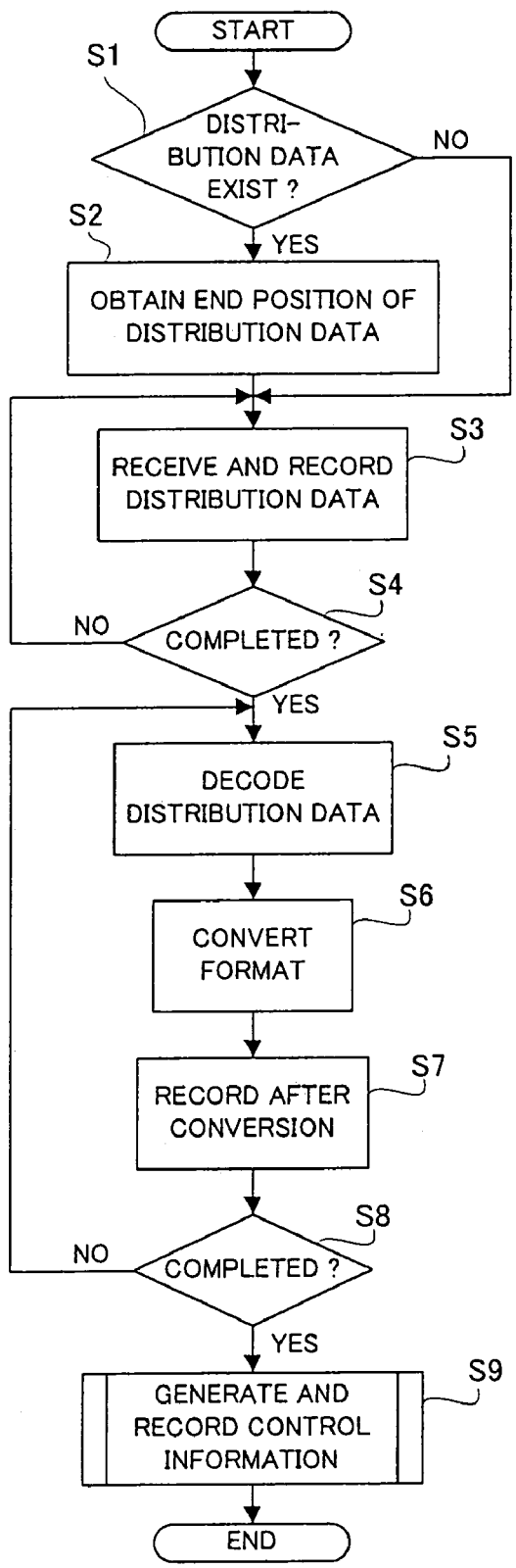
FIG. 2 is a flowchart showing a data recording process.
Figure 3:
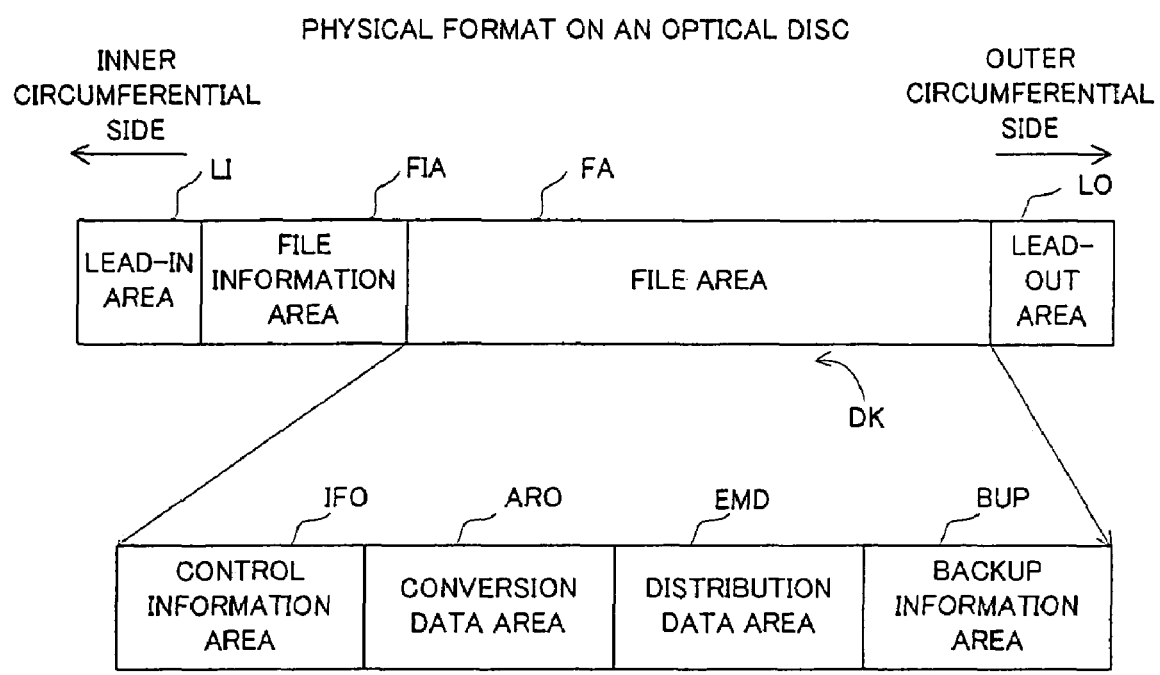
FIG. 3 is a view showing a physical format on an optical disc.
Figure 4:
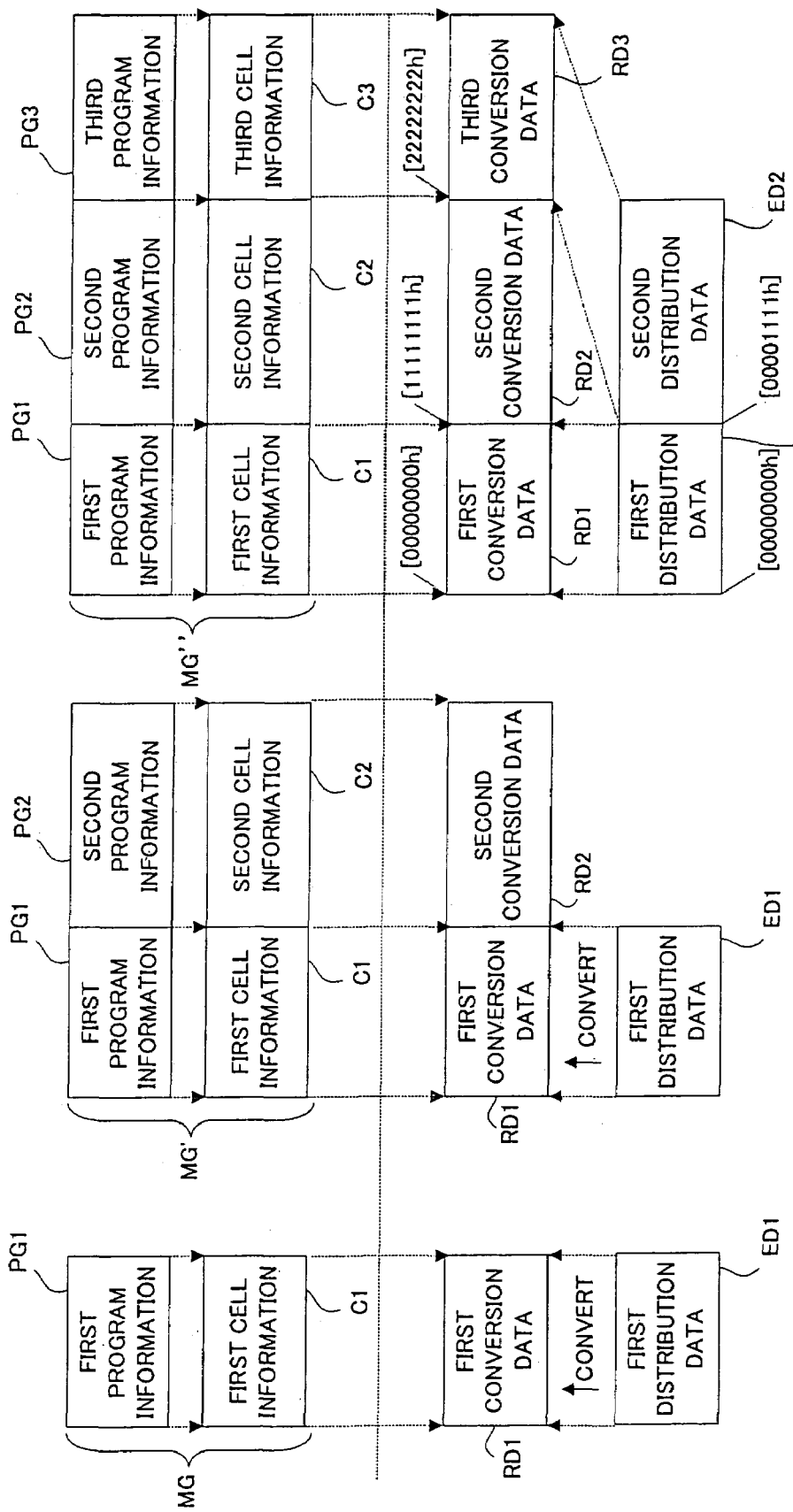
FIG. 4A is a view exemplifying a concept of a data recording process.
FIG. 4B is a view exemplifying a concept of a data recording process.
FIG. 4C is a view exemplifying a concept of a data recording process.
Figure 5:
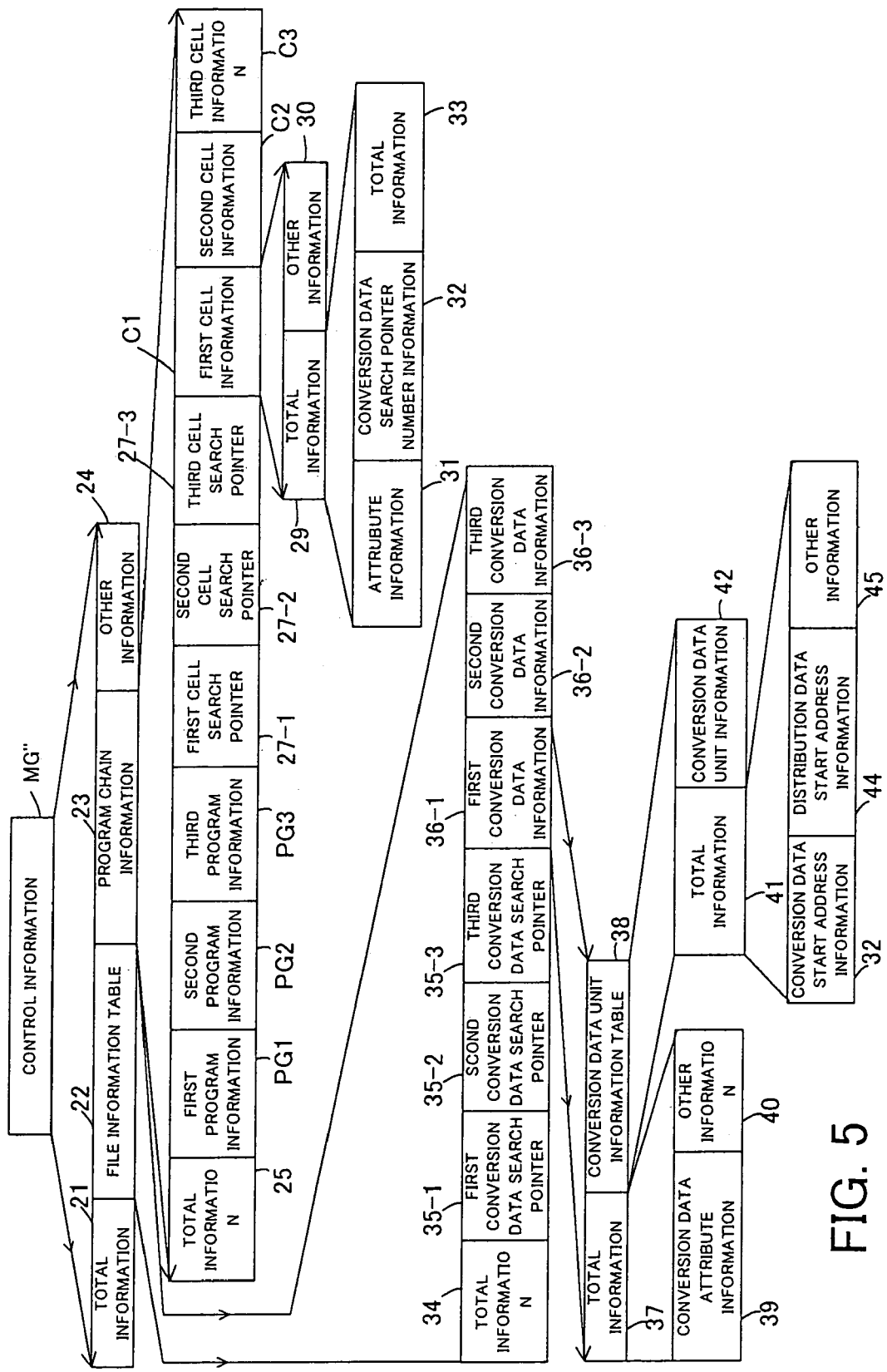
FIG. 5 is a view showing a configuration of a control information.
Figure 6:
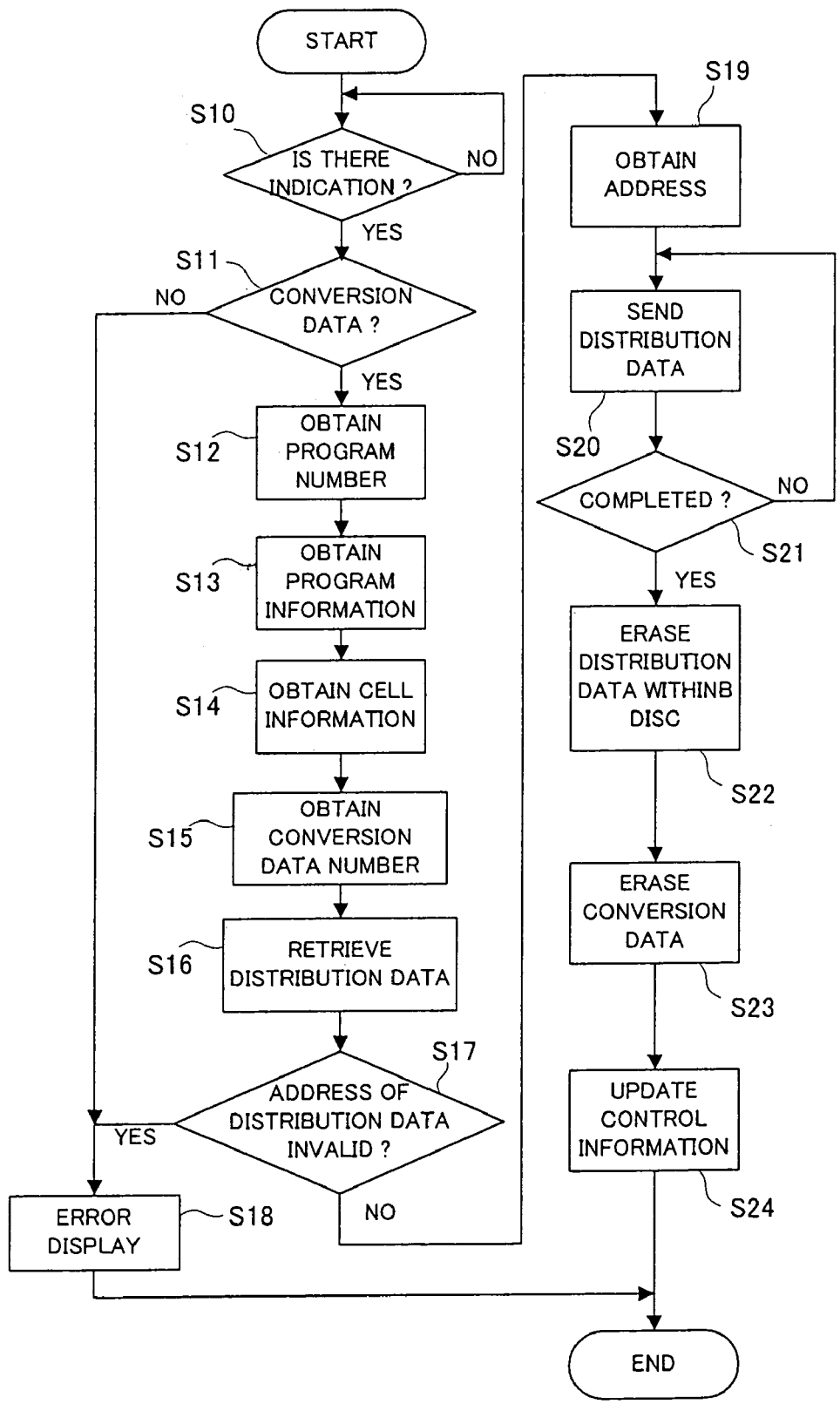
FIG. 6 is a flowchart showing a data moving process.

FIG. 1 is a block diagram showing the schematic configuration of an information recording apparatus according to the embodiment, FIG. 2 is a flowchart showing a data recording process to be executed in the information recording apparatus, FIG. 3 is a view showing a physical format on an optical disc after the execution of the data recording process in the embodiment, FIG. 4A to FIG. 4C are views exemplifying the concept of the data recording process, FIG. 5 is a view showing the configuration (hierarchical structure) of control information, and FIG. 6 is a flowchart showing a data moving process to be executed in the information recording apparatus.

An information recording apparatus according to the embodiment has the function of recording music information distributed from a distribution server by using the EMD on an optical disc and returning the music information to the distribution server after the completion of the listening, and it additionally has the function of recording music information inputted from an external portion through an input terminal (not shown) on the optical disc and outputting the recorded music information to an external apparatus (except the distribution server), such as a speaker and the like, through an output terminal (not shown).

Namely, as shown in FIG. 1, an information recording apparatus S according to the embodiment is provided with a spindle motor 1, a pickup 2, a demodulator 3, switches 4, 6 and 12, an audio reproducing device 5, a D/A (Digital/Analog) converter 7, a system controller 8, a system interface 9, a format converter 10, a formatter 11, an A/D (Analog/Digital) converter 13, a memory 14, a modulator 15 and a servo IC (Integrated Circuit) 16.

Also, the formatter 11 includes switches 11b, 11c and a record data generator 11a.

Moreover, the system controller 8 includes a navigation information generator 8a.

The operation will be described below.

(A) Recording Operation from External Sound Source

At first, the operation when music information inputted from the external sound source except the distribution server in the EMD is recorded on a recordable optical disc DK is described. The external sound source can output music information having a record format that can be reproduced by a plurality of kinds of information reproducing apparatuses, for example, music information of linear PCM format. The external sound source is, for example, an optical disc player or the like.

For example, the recording operation is carried out in the condition that the switch 11b in the formatter 11 is switched to the side of the switch 12 on the basis of a control signal Ssf from the system controller 8.

At first, if music information inputted through the input terminal from the external sound source is an analog signal which is referred to as music information Sina, the music information Sina is inputted to the A/D converter 13, and digitized by the A/D converter 13, and then outputted to one input terminal of the switch 12 as digital music information Sad.

On the other hand, if music information from the external sound source is a digital signal which is referred to as music information Sind, the music information Sind is inputted in its original state to the other input terminal of the switch 12.

Then, the switch 12 selects any one of the digital music information Sad and the music information Sind as the music information to be recorded on the optical disc DK, on the basis of a control signal Ssc3 from the system controller 8, and then outputs it to one input terminal of the switch 11b as an input music information Sin.

At this time, as the switch 11b is switched to the side of the switch 12, the input music information Sin is outputted as a music information Srr from the switch 11b to the record data generator 11a.

On the other hand, on the basis of the content of the music information Sina or Sind inputted from the external sound source, the navigation information generator 8a in the system controller 8 generates control information, and then outputs it as a control signal Snv to the record data generator 11a. For example, this control information is referred to as navigation information. The control information is information for controlling a reproduction manner (a reproducing order, any one of the music information to be reproduced or the like) when any of the music information is recorded on the optical disc DK and it is then reproduced, so as to comply with the format which will be described later.

The control information indicates the reproducing manner at the time of the reproduction of the music information. Specifically, the music information is divided into partial information referred to as programs. Each program is further divided into information units referred to as cells. The control information indicates the reproducing manner with respect to cells. That is, in the music information, the cell is the minimum unit to be reproduced. The control information includes the information for describing the reproducing order for each cell. More specifically, address information of each cell on the optical disc DK is described in the control information in the reproducing order. In other words, the control information includes the logical information (may be also referred to as the logical format) describing the reproducing order of the respective cells included in the respective programs.

Next, the record data generator 11a superimposes the music information Srr and the control information Snv so as to comply with the format, which will be described later, and outputs as a superimposition information Smx to the modulator 15.

On the basis of the superimposition information Smx, the modulator 15 generates a record signal Sr for modulating a strength of a recording light beam B emitted from the pickup 2 in order to record the superimposition information Smx on the optical disc DK. The modulator 15 then outputs the record signal Sr to a semiconductor laser driver (not shown) for driving a semiconductor laser (not shown) in the pickup 2.

After that, the semiconductor laser driver drives the semiconductor laser so as to modulate the strength of the light beam B correspondingly to the content of the record signal Sr, and therefore, the pickup 2 emits the modulated light beam B. Then, since the light beam B is emitted onto an information recording surface of the optical disc DK while the strength of the light beam B is modulated, a recording pit whose shape is changed correspondingly to the content of the record signal Sr is formed on the information recording surface. Accordingly, the music information Sina or Sind is recorded on the optical disc DK.

At this time, the emission position of the light beam B in the vertical direction with respect to the information recording surface (namely, the light collection position of the light beam B) is controlled by driving a focus actuator (not shown) in the pickup 2, on the basis of a control signal Ssp from the servo IC 16. The emission position of the light beam B in the horizontal direction with respect to the information recording surface is controlled by the driving a tracking actuator (not shown) in the pickup 2, on the basis of the control signal Ssp.

Moreover, the spindle motor 1 carries out the rotation control so as to rotate the optical disc DK at a predetermined number of rotations, on the basis of a control signal Ssm from the servo IC 16.

The generation and output of each of the control signals Ssm and Ssp in the servo IC 16 are controlled by a control signal Sss from the system controller 8

(B) Reproduction and Output Operation to External Portion

A reproduction operation and an output operation in the information recording apparatus shown in FIG. 1 is described below.

The information recording apparatus can reproduce the music information recorded on the optical disc DK by the recording operation described in the item (A) and output it to external speakers and the like.

For example, the reproducing operation is carried out in the condition that the switch 4 is switched to the side of the audio reproducing device 5 on the basis of a control signal Sscl from the system controller 8, the reproducing operation.

At first, at the time of the reproducing process, the spindle motor 1 carries out the rotation control so as to rotate the optical disc DK at the predetermined number of rotations, on the basis of the control signal Ssm from the servo IC 16.

Then, the light beam B having a constant strength for reproduction is emitted from the semiconductor laser (not shown) in the pickup 2 to the information recording surface of the optical disc DK. At this time, the emission positions of the light beam B in the vertical direction and the horizontal direction with respect to the information recording surface are controlled by driving the focus actuator and the tracking actuator (not shown) within the pickup 2, on the basis of the control signal Ssp from the servo IC 16, similarly to the time of the information recording.

Moreover, in order to attain them, the servo IC 16 generates the control signals Ssm and Ssp and outputs them respectively, on the basis of the control signal Sss from the system controller 8.

Incidentally, when the music information recorded on the optical disc DK is reproduced, the recording positions of the music information on the optical disc DK is determined on the basis of the content of the control information recorded on the optical disc DK together with the music information by the above mentioned recording process.

Next, the light beam B emitted to the information recording surface is modulated by the recording pit formed on the information recording surface, and its reflection light is received by a light detector (not shown) within the pickup 2. Then, a detection signal Spp including information corresponding to the strength change in the reflection light received by the light detector is generated and outputted to the demodulator 3.

After that, the demodulator 3 performs a predetermined demodulating process on the detection signal Spp, generates a demodulation signal Sp, and outputs it to the audio reproducing device 5 through the switch 4 switched to the side of the audio reproducing device 5.

Thus, the audio reproducing device 5 performs a predetermined reproducing process on the demodulation signal Sp, and generates a reproduction signal Soutd serving as a digital signal, and then outputs it in its original state to external speaker system and the like through a digital output terminal (not shown), and also outputs it to the D/A converter 7.

Then, the D/A converter 7 makes the reproduction signal Soutd analog, and outputs it as an analog reproduction signal Souta through an analog output terminal (not shown) to an external different speaker and the like.

(C) Operation for Recording Music Information Through EMD

The operation for recording music information distributed from a distribution server in the EMD on the optical disc DK is described below.

For example, this recording operation is carried out in the following condition. Namely, the switch 11b and the switch 11c in the formatter 11 are switched to the side of the switch 11c and the side of the system interface 9, respectively, on the basis of the control signal Ssf from the system controller 8. Also, the switch 4 is switched to the side of the switch 6 on the basis of the control signal Sscl from the system controller 8. Moreover, the switch 6 is switched to the side of the memory 14 on the basis of the control signal Ssc from the system controller 8.

At first, music information Sine distributed from the distribution server is inputted to an input terminal, and then supplied to the system interface 9. In the system interface 9, a predetermined interface process is performed on the music information Sine. The music information Sine is then outputted to one input terminal of the switch 11c.

At this time, as the switch 11c is switched to the side of the system interface 9, the music information Sine is supplied to one terminal of the switch 11b in its original state as a music information Ssw.

Consequently, as the switch 11b is switched to the side of the switch 11c, the music information Ssw is supplied to the record data generator 11a in its original state as a music information Srr.

Then, the record data generator 11a outputs it as a superimposition information Smx to the modulator 15 without performing any process on the music information Srr.

On the basis of the superimposition information Smx, the modulator 15 generates a record signal Sr for modulating the strength of the recording light beam B emitted from the pickup 2 in order to record the superimposition information Smx on the optical disc DK. The modulator 15 then outputs the record signal Sr to the semiconductor laser driver in the pickup 2.

After that, the semiconductor laser driver drives the semiconductor laser so as to modulate the strength of the light beam B correspondingly to the content of the record signal Sr, and therefore, the pickup 2 emits the modulated light beam B. Then, since the light beam B is emitted onto an information recording surface within the optical disc DK while the strength of the light beam B is modulated, a recording pit whose shape is changed correspondingly to the content of the record signal Sr is formed within the information recording surface. Accordingly, the music information Sine is recorded in its original state as a distribution data as described later, on the optical disc DK.

At this time, the emission positions of the light beam B in the vertical direction and the horizontal direction with respect to the information recording surface are respectively controlled by driving the focus actuator and the tracking actuator in the pickup 2 in the similar manner in the recording operation mentioned in the item (A).

Moreover, the spindle motor 1 carries out the rotation control in the similar manner in the recording operation mentioned in the item (A), so as to rotate the optical disc DK at a predetermined number of rotations, on the basis of a control signal Ssm from the servo IC 16.

The generation and output of each of the control signals Ssm and Ssp in the servo IC 16 are controlled by a control signal Sss from the system controller 8.

When the recording of the music information Sine distributed from the distribution server onto the optical disc in its original state as the distribution data is complete, the information recording apparatus continuously reads out this distribution data from the optical disc DK. Specifically, when the recording process is complete, the system controller 8 then outputs to the servo IC 16 the control signal Sss for controlling the emission position of the light beam B in order to read out the distribution data. The servo IC 16 controls the emission position of the light beam B in order to reproduce the distribution data recorded immediately before, on the basis of the control signal Sss. Incidentally, in parallel to this process in the system controller 8, the switch 11c within the formatter 11 is switched to the side of the format converter 10, on the basis of the control signal Ssf.

Then, the pickup 2 receives the reflection light from the optical disc DK of the light beam B in which the emission position is controlled, and generates the detection signal Spp corresponding to the content of the recorded distribution data, and then outputs it to the demodulator 3.

Next, the demodulator 3 performs a predetermined demodulating process on the detection signal Spp, and generates a demodulation signal Sp. The demodulation signal Sp is supplied to the memory 14 through the switches 4 and 6 switched in the above-mentioned manner. The memory 14 transiently holds or accumulates the demodulation signal Sp.

On the other hand, the navigation information generator 8a reads out the demodulation signal Sp from the memory 14 as a memory signal Smm, and analyzes its content. On the basis of the analysis of the contents of the memory signal Smm, the navigation information generator 8a then generates the control information (navigation information) to be recorded on the optical disc DK together with the music information included in the demodulation signal SP, so as to comply with the format as described later, and further outputs it as the control information Snv to the record data generator 11a. Incidentally, the control information is used for controlling the reproducing manner when the music information recorded on the optical disc DK by this recording operation is reproduced.

While the navigation information generator 8a generates the control information, the demodulation signal Sp held in the memory 14 is also outputted to the format converter 10.

The format converter 10 decodes the demodulation signal Sp, and then converts a record format of the music information included in the decoded demodulation signal Sp into a record format that can be decoded by a plurality of kinds of information recording apparatuses different from each other, for example, a record format of a linear PCM (Pulse Code Modulation). The format converter 10 then outputs the converted signal as a conversion signal Sdc to the switch 11c switched to the side of the format converter 10.

Next, the switch 11c outputs the conversion signal Sdc as the music information Ssw to one input terminal of the switch 11b.

At this time, as the switch 11b is switched to the side of the switch 11c, the music information Ssw is supplied to the record data generator 11a in its original state as the music information Srr.

Next, the record data generator 11a superimposes the music information Srr and the control information Snv so as to comply with the format as described later, and then outputs the superimposed information as the superimposition information Smx to the modulator 15.

The modulator 15 generates a record signal Sr for modulating the strength of the recording light beam B emitted from the pickup 2, on the basis of the superimposition information Smx, in order to record the superimposition information Smx on the optical disc DK. The modulator 15 then outputs the record signal Sr to the semiconductor laser driver (not shown) in the pickup 2.

After that, the semiconductor laser driver drives the semiconductor laser so as to modulate the strength of the light beam B correspondingly to the content of the record signal Sr, and therefore, the pickup 2 emits the modulated light beam B. Then, since the light beam B is emitted onto an information recording surface within the optical disc DK while the strength of the light beam B is modulated, a recording pit whose shape is changed correspondingly to the content of the record signal Sr is formed within the information recording surface. Accordingly, the music information obtained by converting the record format of the previously recorded distribution data is recorded on the optical disc DK as a conversion data.

At this time, the emission positions of the light beam B in the vertical direction and the horizontal direction with respect to the information recording surface are respectively controlled by driving the focus actuator and the tracking actuator in the pickup 2 in the similar manner in the above mentioned recording operation with respect to the distribution data.

Incidentally, in the distribution data and the conversion data recorded on the optical disc DK by using the series of the operations, the information actually reproduced as the music information by the plurality of reproducing apparatuses is the music information recorded as the conversion data. The distribution data is used in moving the music information to the above-mentioned different reproducing apparatus or returning the music information back to the distribution server.

Next, an operation to move the distribution data recorded on the optical disc DK by the above mentioned recording operation to the different reproducing apparatus and the like or to return the distribution data back to the distribution server is described below.

For example, this operation is carried out in the condition that the switch 4 is already switched to the side of the switch 6 on the basis of the control signal Ssc1 from the system controller 8, and the switch 6 is already switched to the side of the system interface 9 on the basis of the control signal Ssc from the system controller 8.

Moreover, when the moving or returning operation is carried out, the spindle motor 1 carries out the rotation control so as to rotate the optical disc DK at the predetermined number of the rotations, on the basis of the control signal Ssm from the servo IC 16.

Moreover, when this operation is carried out, the light beam B having the constant strength for the reproduction is emitted from the semiconductor laser (not shown) in the pickup 2 to the information recording surface of the optical disc DK. At this time, the emission positions of the light beam B in the vertical direction and the horizontal direction with respect to the information recording surface are controlled by driving the focus actuator and the tracking actuator (not shown) within the pickup 2, on the basis of the control signal Ssp from the servo IC 16, similarly to the time of the information recording.

Incidentally, when the distribution data recorded on the optical disc DK is reproduced, the recording positions of the distribution data on the optical disc DK can be determined on the basis of the content of the control information recorded on the optical disc DK together with the music information by the above mentioned recording process.

Next, the light beam B emitted to the information recording surface is modulated by the recording pit formed on the information recording surface, and its reflection light is received by the light detector (not shown) within the pickup 2. Then, the detection signal Spp is generated and outputted to the demodulator 3.

Then, the demodulator 3 performs the predetermined demodulating process on the detection signal Spp, generates the demodulation signal Sp, and outputs it through the switches 4 and 6 to the system interface 9.

Then, the system interface 9 performs the predetermined interface process on the demodulation signal Sp, and returns it as music information Soute to the distribution server or moves it to a different reproducing apparatus and the like. At this time, the distribution data after the return or the movement is erased from or invalidated on the optical disc DK.

Next, the series of the data recording processes through the EMD as mentioned above is collectively described below with reference to the flowchart shown in FIG. 2.

As shown in FIG. 2, in the data recording process, firstly, the record information on the optical disc DK is checked for an existence of the distribution data which is the music information previously obtained through the EMD and recorded on the optical disc DK in its original state (Step S1). If the distribution data does not exist (Step S1; NO), the operational flow proceeds to the process at the step S3. On the other hand, if the previously distributed distribution data is already recorded (Step S1; YES), the end of the record position on the optical disc DK with respect to the newest data in the previous distribution data is obtained and held. (Step S2).

When music information distributed from the distribution sever is received, the music information is recorded at the lead of the recording region of the optical disc DK or the position immediately after the end of the record position which is obtained in Step S2, in accordance with the above mentioned series of the recording processes (Step S3). Incidentally, the region in which those distribution data are recorded is hereafter referred to as a distribution data area.

While the distribution data is recorded, this recording operation is monitored in order to recognize the completion of the recording of the distribution data (Step S4). If the recording has not been completed (Step S4; NO), the operational flow returns back to the process at the step S3, and it continues the receiving and recording processes. On the other hand, if the recording has been completed (Step S4; YES), the once-recorded distribution data is read out from the optical disc DK. This distribution data is then decoded (Step S5), and its format is converted into, for example, the linear PCM format by the format converter 10 (Step S6). This converted data (including the music information therein) is recorded as the conversion data in a conversion data area ARO, which will be described later, on the optical disc DK (Step S7). Incidentally, at this time, the component of the control information to be superimposed on the music information and to be recorded together with the music information is recorded simultaneously or parallel with the recording of the conversion data.

The operations in Steps S5 through S7 are monitored in order to recognize the completion of the recording of the conversion data (Step S8). If the recording has not been completed (Step S8; NO), the operational flow returns back to the process at the step S5, and it continues the decoding and converting processes and the like. On the other hand, if the recording has been completed (Step S; YES), the control information to be recorded separately from the conversion data (including the record end position obtained in the process at the step S2) is recorded in the manner that it corresponds to the music information and is comply with the format described after (Step S9). Thereafter, the series of the data recording process ends.

(D) Record Format on the Optical Disc

The record format used in recording the distribution data and the conversion data in accordance with the operations described with reference to FIG. 1 and FIG. 2 will be described below.

At first, a physical format indicative of a physical data structure on the optical disc DK is described with reference to FIG. 3 and FIG. 4.

As shown in a top view of FIG. 3, the optical disc DK for recording conversion data and distribution data thereon has, from the inner side thereof, a lead-in area LI for recording control information to be read-in when a reproduction of music information recorded on the optical disc DK is started (including address information indicative of the lead of a region on the optical disc DK on which the music information and the like are recorded), a file information area FIA for recording file information indicative of a hierarchical structure in the music information recorded as the distribution data and the conversion data and the like, a file area FA for actually recording the distribution data and the conversion data, and a lead-out area LO for recording control information to be read-in when the reproduction of the music information is ended (including address information indicative of the end of the region on the optical disc DK on which the music information and the like are recorded and the like).

The file area FA has therein a control information area IFO for storing the above-mentioned control information (except the control information that is included and recorded in the conversion data), a conversion data area ARO for recording the conversion data together with the control information included in it, a distribution data area EMD for storing only the distribution data, and a control information backup information area BUP for storing the control information identical to the control information stored in the control information area IFO as a so-called backup (spare) information.

Here, in the conversion data area, each piece of the music information includes one or a plurality of programs, and each program includes one or a plurality of cells.

Next, the changes in the recording manners of the respective data recorded in the respective areas shown in FIG. 3 will be described below with reference to FIG. 4. FIG. 4 exemplifies the following case. That is, after one conversion data and one distribution data corresponding to it are firstly recorded together with the corresponding control information, another conversion data which is music information of the linear PCM format supplied from an external sound source except a distribution server is recorded together with the corresponding control information. Moreover, after that, another conversion data and distribution data corresponding to it are further recorded together with the corresponding control information. Here, let us suppose that each of the conversion data is constituted by one program constituted by one cell.

At first, as a result of recording one conversion data and the corresponding distribution data together with the corresponding control information, as shown in FIG. 4A, first distribution data ED1 serving as the one distribution data is stored in the distribution data area EMD of the optical disc DK, and first conversion data RD1 obtained through its conversion is stored in the conversion data area ARO.

Then, control information MG corresponding to the first conversion data RD1 is recorded such that first program information PG1 indicating the number of the cells included in the one program constituting the first conversion data RD1 and first cell information C1 including address information (hereafter, similarly indicating an off-set logical address from the lead of the conversion data area ARO) indicating a record start position on the optical disc DK with regard to one cell constituting the one program and the like mutually form the hierarchical structure.

Next, after the first distribution data ED1 and the first conversion data RD1 are recorded, music information of the linear PCM format outputted from, for example, an external CD (Compact Disc) reproducing apparatus or the like is recorded in its original state together with the corresponding control information. As a result, as shown in FIG. 4B, second conversion data RD2 corresponding to the music information is stored in the conversion data area ARO. Incidentally, as for the second conversion data RD2 in this case, the music information inputted from the external CD reproducing apparatus or the like is substantially recorded in its original state in accordance with the linear PCM format.

Then, control information corresponding to the second conversion data RD2 is recorded such that second program information PG2 indicating the number of the cells included in the one program constituting the second conversion data RD2 and second cell information C2 including an address information indicating a record start position on the optical disc DK with regard to one cell constituting the one program and the like mutually form the hierarchical structure. Incidentally, the control information corresponding to the first conversion data RD1 and the second conversion data RD2 is referred to as a control information MG'.

Finally, after the second conversion data RD2 is recorded, another conversion data and distribution data corresponding to it are recorded together with the corresponding control information. As a result, as shown in FIG. 4C, second distribution data ED2 as the different distribution data is stored in the distribution data area EMD of the optical disc DK. Moreover, third conversion data RD3 obtained through its conversion is stored as the different conversion data in the conversion data area ARO.

Then, control information corresponding to the third conversion data RD3 is recorded such that third program information PG3 indicating the number of the cells included in the one program constituting the third conversion data RD3 and third cell information C3 including an address information indicating a record start position on the optical disc DK with regard to one cell constituting the one program and the like mutually form the hierarchical structure. The control information corresponding to the first conversion data RD1 through the third conversion data RD3 is referred to as a control information MG".

Incidentally, in the example described by using FIG. 4, the address information of the respective conversion data RD1, RD2 and RD3 in the conversion data area ARO are, for example 00000000h, 1111111h and 22222222h (hereafter, 'h' indicates a hexadecimal notation) in the order starting from the first conversion data RD1. Moreover, the address information of the respective distribution data ED1 and ED2 in the distribution data area EMD (in this case, the off-set logical address from the lead of the distribution data area EMD) are, for example, 00000000h and 00001111h in the order starting from the first distribution data ED1.

The logical format in the above-mentioned control information will be described below in detail by exemplifying the control information MG" of FIG. 4C with reference to FIG. 5.

The control information MG" including the control information corresponding to the first conversion data RD1 to the third conversion data RD3, respectively, is provided with total information 21, file information table 22, program chain information 23 and other information 24 necessary to control reproduction and other operations, as shown in FIG. 5.

The total information 21 includes the information with regard to the entire optical disc DK in the condition that the data until the third conversion data RD3 are recorded, actually, the numbers of the respective distribution data and conversion data recorded at that time, the start positions on the optical disc DK of the respective conversion data area ARO and distribution data area EMD, and the like.

Next, the file information table 22 includes the attributes of the respective conversion data (namely, whether or not it is the conversion data converted from the distribution data) which will be described later, the record start positions on the optical disc DK of the respective conversion data, and the like.

Moreover, the program chain information 23 includes the above-mentioned program information and cell information.

Next, the program chain information 23 will be concretely described below. The program chain information 23 in the control information MG" includes' total information 25; the first to third program information PG1 to PG3; first to third cell search pointers 27-1 to 27-3 respectively indicating the positions on the optical disc DK on which the first to third cell information C1 to C3 are recorded; and the first to third cell information C1 to C3, as shown in FIG. 5.

Also, one cell information (for example, the first cell information 1) is composed of total information 29 and other information 30 necessary as the cell information.

Then, the total information 29 includes: attribute information 31 indicative of an attribute of conversion data containing a cell to which the total information 29 corresponds; conversion data search pointer number information 32 implying a number of conversion data search pointer, which will be described later, corresponding to the conversion data containing the cell to which the cell information containing the total information 29 corresponds; and other information 33 necessary as the total information 29.

Here, since the total information 29 contains the conversion data search pointer number information 32, it is possible to correlate the conversion data and the cell information containing the total information 29 with each other.

Also, the attribute information 31 indicates whether or not the conversion data containing the cell is the conversion data converted from the distribution data, on the basis of the content of the most significant bit, and further indicates whether or not the cell is the cell serving as the music information, on the basis of the content of the lower two bits.

That is, for example, if the most significant bit of the attribute information 31 is at [1], it can imply that the conversion data containing the cell is the data converted from the distribution data. On the other hand, if the most significant bit is at [0], it can imply that the conversion data containing the cell is not the data converted from the distribution data, actually, for example, the data is the music information of the linear PCM format reproduced from a CD reproducing apparatus. Moreover, if the lower two bits of the attribute information 31 are at [10], it can imply that the cell is the cell serving as the music information.

Next, the file information table 22 will be concretely described below. The file information table 22 includes: total information 34 containing conversion data information corresponding to the respective conversion data, which will be described later, information indicating the number of conversion data search pointers, and the like; first conversion data information 36-1 containing record position information with regard to the first conversion data RD1 and the like; second conversion data information 36-2 containing record position information with regard to the second conversion data RD2 and the like; third conversion data information 36-3 containing record position information with regard to the third conversion data RD3 and the like; and first to third conversion data search pointers 35-1 to 35-3 respectively indicating the positions on the optical disc DK on which the first to third conversion data information 36-1 to 36-3 are recorded.

Also, the respective conversion data information includes total information 37 and a conversion data unit information table 38.

The total information 37 includes therein conversion data attribute information 39 (having the content equal to the corresponding content of the attribute information 31) and other information 40 necessary as the total information 37.

Moreover, the conversion data unit information table 38 includes therein total information 41 and conversion data unit information 42 indicative of an information amount in each information constituting the corresponding conversion data.

Then, the total information 41 includes: conversion data start address information 43 implying address information in the conversion data area ARO of the corresponding conversion data; distribution data start address information 44 in the distribution data area EMD of the distribution data, which is the conversion source of the conversion data; and other information 45 necessary as the total information 41.

Here, the content of the distribution data start address information 44 is described in detail. If the corresponding conversion data is obtained through the conversion of the distribution data (namely, if the most significant bit of the attribute information 31 is at [1] in the above-mentioned example), the address information corresponding to the distribution data serving as the conversion source is described as the distribution data start address information 44. On the other hand, if the corresponding conversion data is not the data obtained through the conversion of the distribution data (namely, if the most significant bit of the attribute information 31 is at [0] in the above-mentioned example), the distribution data serving as the conversion source is not originally present. Thus, the originally invalid information (for example, FFFFFFFFh and the like) is described as the distribution data start address information 44.

Also, when the distribution data is already present (Step S1 of FIG. 2; YES), the end position information of the newest data within the previous distribution data obtained through the process at the step S2 in FIG. 2 is described as the distribution data start address information 44 at step S9 in FIG. 2.

(E) Data Moving Process

Finally, the data moving process based on the series of EMD mainly executed with the system controller 8 (namely, the process of check-in or move) is described by using a flowchart shown in FIG. 6.

As shown in FIG. 6, in the data moving process of the embodiment, the system controller 8 firstly checks whether or not an operation to indicate the start of the execution of the data moving process is carried out by using an operating device (not shown in FIG. 1) (Step S10). If the operation is not carried out (Step S1; NO), the system controller 8 waits until it is carried out. On the other hand, if the operation is carried out (Step S10; YES), the system controller 8 next checks the attribute information 31 corresponding to the conversion data targeted for the data moving process, and accordingly determines whether or not the cell to which the attribute information 31 corresponds (in other words, the corresponding conversion data containing the cell) is the cell (conversion data) obtained through the conversion of the distribution data (Step S1). Then, if the cell (conversion data) is not the cell obtained through the conversion of the distribution data (Step S11; NO), the non-existence of the corresponding distribution data disables the execution of the data moving process shown in FIG. 6. Thus, the system controller 8 displays its fact as an error on a display (not shown) (Step S18), and ends the data moving process itself. On the other hand, if the cell (conversion data) is the cell obtained through the conversion of the distribution data (Step S11; YES), the system controller 8 next obtains a program number indicative of a program targeted for the movement (Step S12), and further uses the program number as a hint to thereby obtain a corresponding program information PG (Step S13), and further uses the program number PG as a hint to thereby obtain a corresponding cell information C (Step S14), and then obtains the number of the conversion data to which the cell belongs, on the basis of the content of the conversion data search pointer number information 32 (refer to FIG. 5) contained in the total information 29 within the cell information C (Step S15), and further obtains (or retrieves) the distribution data start address information 44 of the distribution data described in the conversion data information corresponding to the conversion data of the obtained number (Step S16).

Then, the system controller 8 determines whether or not the content of the obtained distribution data start address information 44 is FFFFFFFFh (Step S17). If the content is FFFFFFFFh, namely, an invalid value (Step S17; YES), the system controller 8 ends the data moving process itself through the above-mentioned error process at the step S18.

On the other hand, at the determination of the step S16, if the content of the distribution data start address information 44 is a value except FFFFFFFFh, namely, a valid address information (Step S17; NO), the system controller 8 next obtains that address information (Step S19), and reads out the distribution data recorded in the distribution data area EMD on the basis of the address indicated by the obtained address information, and then returns the distribution data as the above-mentioned music information Soute to the distribution server (check-in) or moves it to a different apparatus (Step S20).

Then, the system controller 8 checks whether or not the return or moving process for the distribution data is completed (Step S21). If the process is not completed (Step S21; NO), it continues the process. On the other hand, if the process is completed (Step S21; YES), the system controller 8 erases or invalidates the distribution data targeted for the return or the movement on the optical disc DK (Step S22). Moreover, the system controller 8 converts the distribution data targeted for the return or the movement, and erases or invalidates even the conversion data recorded in the conversion data area ARO (Step S23), and updates the content of the control information corresponding to the erased distribution data and conversion data (Step S24), and then ends the series of the data moving process.

As mentioned above, in the operation of the information recording apparatus S according to the embodiments, the input music information is converted into the linear PCM format and recorded. Thus, it is possible to record the music information in the condition that the decoding and the reproduction can be carried out by a plurality of kinds of information reproducing apparatuses, and further possible to obtain the compatibility in the reproducing process.

Also, the music information is recorded in the condition that it is not compressed in accordance with the linear PCM format. Thus, it is possible to reproduce the music information after the recording by using the wide kinds of the information reproducing apparatuses. Hence, it is possible to attain the compatibility in the reproducing process at the higher level.

Moreover, the music information inputted from the CD reproducing apparatus or the like in the condition already encoded in accordance with the linear PCM format is recorded in its original state on the optical disc DK. Thus, the encoding process that is not required to obtain the compatibility in the reproducing process is not executed.

Furthermore, not only the music information serving as the conversion data converted into the linear PCM format, but also the music information before the conversion is recorded in its original states as the distribution data. Thus, the copy limit information in the music information after recorded on the optical disc DK and the like can be set on the basis of the distribution data. Hence, it is possible to provide to the normal distribution route of the music information.

Incidentally, the program corresponding to the flowchart shown in FIG. 2 and FIG. 6 is recorded on a flexible disc or a hard disc or the like. Then, for example, when it is read out from a general micro computer and the like and carried out, the micro computer can function as the system controller 8 of the embodiment.

Moreover, the case in which the music information is recorded on the optical disc DK is described in the above-mentioned embodiments. However, besides it, the present invention can be applied to the acquisition of the compatibility when the picture information containing the corresponding music information is recorded on the optical disc DK.

Moreover, record information is not limited to music information. The present invention can be applied to recording of other information, for example, video information, picture information, etc.

Furthermore, the present invention can be applied to the case when not only the optical disc DK but also a hard disc or a semiconductor memory is used as the recording medium.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-217256 filed on Jul. 17, 2001 including the specification, claims, drawings and summary is incorporated herein by reference in its entirety.

What is claimed is:

1. An information recording apparatus comprising:
   a receiving means for receiving a compressed distribution data from a distribution server;
   a first recording means for recording the compressed distribution data onto a recording medium;
   a converting means for generating a conversion data by converting the format of the compressed distribution data into the format of a linear pulse code modulation (PCM);
   a second recording means for recording the conversion data onto the recording medium on which the compressed distribution data is recorded; and
   a third recording means for recording a control information including a first information indicating a recording position of the compressed distribution data on the recording medium and a second information indicating a recording position of the conversion data on the recording medium onto the recording medium on which the compressed distribution data and the conversion data are recorded.

2. The information recording apparatus according to claim 1, wherein the third recording means generates a table in which the first information and the second information are arranged.

3. The information recording apparatus according to claim 2, wherein the first information and the second information are sequentially arranged within the table.

4. The information recording apparatus according to claim 1, wherein the compressed distribution data is a music information distributed from the distribution server in an electronic music distribution (EMD).

5. The information recording apparatus according to claim 1, wherein the compressed distribution data is compressed according to an audio compression-3 (AC-3) method.

6. The information recording apparatus according to claim 1, wherein the compressed distribution data is compressed according to a moving picture expert group 1 audio layer 3 (MP3) method.

7. An information recording method comprising:
   a receiving process of receiving a compressed distribution data from a distribution server;
   a first recording process of recording the compressed distribution data onto a recording medium;
   a converting process of generating a conversion data by converting the format of the compressed distribution data into the format of a linear pulse code modulation (PCM);
   a second recording process of recording the conversion data onto the recording medium on which the compressed distribution data is recorded; and
   a third recording process of recording a control information including a first information indicating a recording position of the compressed distribution data on the recording medium and a second information indicating a recording position of the conversion data on the recording medium onto the recording medium on which the compressed distribution data and the conversion data are recorded.

8. A program storage medium readable by a computer for tangibly embodying a program of instructions executable by the computer to perform an information recording method, the information recording method comprising:
   a receiving process of receiving a compressed distribution data from a distribution server;
   a first recording process of recording the compressed distribution data onto a recording medium;
   a converting process of generating a conversion data by converting the format of the compressed distribution data into the format of a linear pulse code modulation (PCM);
   a second recording process of recording the conversion data onto the recording medium on which the compressed distribution data is recorded; and
   a third recording process of recording a control information including a first information indicating a recording position of the compressed distribution data on the recording medium and a second information indicating a recording position of the conversion data on the recording medium onto the recording medium on which the compressed distribution data and the conversion data are recorded.

* * * * *